US012547109B2

(12) United States Patent
Oi

(10) Patent No.: US 12,547,109 B2
(45) Date of Patent: Feb. 10, 2026

(54) IMAGE FORMING APPARATUS TO CONTROL ELECTRIC POWER

(71) Applicant: CANON KABUSHIKI KAISHA, Tokyo (JP)

(72) Inventor: Ken Oi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/750,549

(22) Filed: Jun. 21, 2024

(65) Prior Publication Data

US 2024/0427270 A1 Dec. 26, 2024

(30) Foreign Application Priority Data

Jun. 22, 2023 (JP) ................................ 2023-102730

(51) Int. Cl.
*G03G 15/20* (2006.01)
*G03G 15/00* (2006.01)

(52) U.S. Cl.
CPC ..... *G03G 15/5004* (2013.01); *G03G 15/2053* (2013.01); *G03G 15/2064* (2013.01); *G03G 15/657* (2013.01); *G03G 15/80* (2013.01)

(58) Field of Classification Search
USPC ........................................................... 399/37
See application file for complete search history.

(56) References Cited

U.S. PATENT DOCUMENTS

2013/0329256 A1* 12/2013 Fukuda .............. G03G 15/6508 358/1.15
2019/0087138 A1* 3/2019 Suzuki .................. G06F 3/1208

FOREIGN PATENT DOCUMENTS

JP H05328075 A 12/1993
JP H06194993 A 7/1994
JP 2011215250 A 10/2011

* cited by examiner

*Primary Examiner* — Quana Grainger
(74) *Attorney, Agent, or Firm* — Canon U.S.A., Inc. IP Division

(57) ABSTRACT

An image forming apparatus includes a fixing device, a control unit, and feeding units. The fixing device includes a tubular fixing film, a fixing heater disposed in a space inside the fixing film and configured to generate heat when electricity is supplied from a commercial power supply, and a pressing roller. The fixing device fixes a toner image formed on a paper sheet to the paper sheet by nipping and transporting the paper sheet at a fixing nip. The control unit is configured to control electric power supplied from the commercial power supply to the fixing heater. The control unit sets a maximum duty based on the feeding unit that is used.

8 Claims, 9 Drawing Sheets

FIG. 3

| SHEET FEEDING UNIT | COMMON PATH 203 OF SHEET FEEDING UNITS | INDIVIDUAL DISTANCE OF EACH SHEET FEEDING UNIT | TRANSPORT DISTANCE TO FIXING NIP 810 |
|---|---|---|---|
| FIRST SHEET FEEDING UNIT 816 | 120 mm | 30 mm | 150 mm |
| SECOND SHEET FEEDING UNIT 201 | 120 mm | 110 mm | 230 mm |
| THIRD SHEET FEEDING UNIT 202 | 120 mm | 190 mm | 310 mm |

FIG. 4

| SHEET FEEDING UNIT | TRANSPORT TIME DIFFERENCE RELATIVE TO FIRST SHEET FEEDING UNIT 816 | PRE-FIXATION HEATING PERIOD $t_x$ FOR EACH SHEET FEEDING UNIT | MAXIMUM ENERGIZATION DUTY REQUIRED TO SUPPLY 3080 J |
|---|---|---|---|
| FIRST SHEET FEEDING UNIT 816 | 0 s | $t_1$ = 4.62 s | 100% |
| SECOND SHEET FEEDING UNIT 201 | 0.53 s | $t_2$ = 5.15 s | 90% |
| THIRD SHEET FEEDING UNIT 202 | 1.07 s | $t_3$ = 5.69 s | 81% |

FIG. 6

| SHEET FEEDING UNIT | PRE-FIXATION HEATING PERIOD $t_x$ FOR EACH SHEET FEEDING UNIT | MAXIMUM ENERGIZATION DUTY REQUIRED TO SUPPLY 3080 J | |
|---|---|---|---|
| | | COMMERCIAL POWER SUPPLY VOLTAGE 100 Vac | COMMERCIAL POWER SUPPLY VOLTAGE 115 Vac |
| FIRST SHEET FEEDING UNIT 816 | $t_1 = 4.62$ s | 100% | 76% |
| SECOND SHEET FEEDING UNIT 201 | $t_2 = 5.15$ s | 90% | 68% |
| THIRD SHEET FEEDING UNIT 202 | $t_3 = 5.69$ s | 81% | 61% |

IMAGE FORMING APPARATUS TO CONTROL ELECTRIC POWER

BACKGROUND

Field

The present disclosure relates to an image forming apparatus.

Description of the Related Art

An electrophotographic image forming apparatus according to the related art includes a fixing device that forms a toner image transferred to a paper sheet into a fixed image by nipping and transporting the paper sheet while heating the toner image. The fixing device includes a heating unit, a pressing roller, a temperature detection unit, and an electricity control unit. The heating unit includes a fixing heater including a heat generating resistor that generates heat when electricity is supplied from a commercial power supply. The pressing roller forms a fixing nip portion between the pressing roller and the heating unit. The temperature detection unit detects the temperature of the heating unit. The electricity control unit controls the electricity supplied to the fixing heater. The amount of electricity supplied to the fixing heater per unit time is controlled based on the difference between the detection result obtained by the temperature detection unit and the target temperature determined by the basis weight, size, etc., of the paper sheet. Thus, the temperature of the fixing heater is controlled. The paper sheet on which the toner image is formed is nipped and transported through the fixing nip portion so that the toner image is heated and fixed to the paper sheet.

The fixing device is designed so that a first print out time (hereinafter referred to as an FPOT) satisfies the desired product specifications. The FPOT is a time for an image forming apparatus to completely discharge the first paper sheet from a paper output unit after receiving a print instruction. As the resistance value of the heat generating resistor decreases, the amount of heat generated per unit time increases, and the temperature of the heating unit rises in a shorter time. However, as the resistance value of the heat generating resistor decreases, the amount of current that flows per unit time increases, necessitating electrical components with higher ratings to be mounted in the electricity control unit. Therefore, the heat generating resistor is set to a suitable resistance value in accordance with the product specifications, such as the transport time in which the paper sheet is transported from a transport start position to the fixing nip and the size, basis weight, type, etc., of the paper sheet.

Japanese Patent Laid-Open No. 5-328075 describes an image forming apparatus that starts controlling the electricity supplied to the fixing device upon reception of image information, thereby reducing the influence of the time to wait for the temperature of the fixing device to rise on the FPOT.

According to Japanese Patent Laid-Open No. 5-328075, the temperature of the fixing device is controlled by controlling the amount of electricity based on the difference between the detection result obtained by the temperature detection unit and the target temperature. Therefore, electricity is supplied to the fixing device irrespective of the transport time. Also, since the temperature control is started in response to a print start instruction, when a transport distance from a sheet feeding position of a sheet feeding unit from which the paper sheet is fed to the fixing nip is long, the fixing device may reach the target temperature in a shorter time depending on the differences in the transport time caused by the differences in the sheet feeding position. As a result, the temperature of the heating unit needs to be maintained while natural heat dissipation occurs in the period from when the fixing heater reaches the target temperature to when the paper sheet reaches the fixing nip. Therefore, the electric power unnecessary for heating the toner image to fix the toner image to the paper sheet is consumed.

SUMMARY

The present disclosure provides an image forming apparatus that consumes less electric power in the period from when the fixing heater reaches the target temperature to when the paper sheet reaches the fixing nip.

An image forming apparatus according to some embodiments includes a fixing device, a control unit, and a plurality of feeding units. The fixing device includes a fixing film having a tubular shape, a fixing heater disposed in a space inside the fixing film and configured to generate heat when electricity is supplied from a commercial power supply, and a pressing roller. The fixing film and the pressing roller form a fixing nip. The fixing device fixes a toner image formed on a paper sheet to the paper sheet by nipping and transporting the paper sheet at the fixing nip. The control unit is configured to control electric power supplied from the commercial power supply to the fixing heater. The plurality of feeding units is configured to feed paper sheets from a sheet feeding position toward the fixing nip. The control unit sets a maximum duty per unit time for supplying electricity to the fixing heater, the maximum duty corresponding to one of the plurality feeding units that is used.

According to some embodiments, the maximum electric power supplied to the fixing heater per unit time is set in accordance with the sheet feeding position of the paper sheet. Accordingly, the electric power used to maintain the temperature of the fixing heater until the paper sheet reaches the fixing nip can be reduced.

Further features of the present disclosure will become apparent from the following description of exemplary embodiments with reference to the attached drawings.

BRIEF DESCRIPTION OF THE DRAWINGS

FIG. 3 is a table showing the transport distance from a sheet feeding position of each sheet feeding unit to a fixing nip.

FIG. 4 is a table showing the maximum energization duty for each sheet feeding unit.

FIG. 6 is a table showing the relationship between the commercial power supply voltage, the pre-fixation heating period for each sheet feeding unit, and the duty according to a second embodiment.

DESCRIPTION OF THE EMBODIMENTS

Various exemplary embodiments, features and aspects of the present disclosure will now be described in detail with reference to the drawings.

First Embodiment

Figure 2:
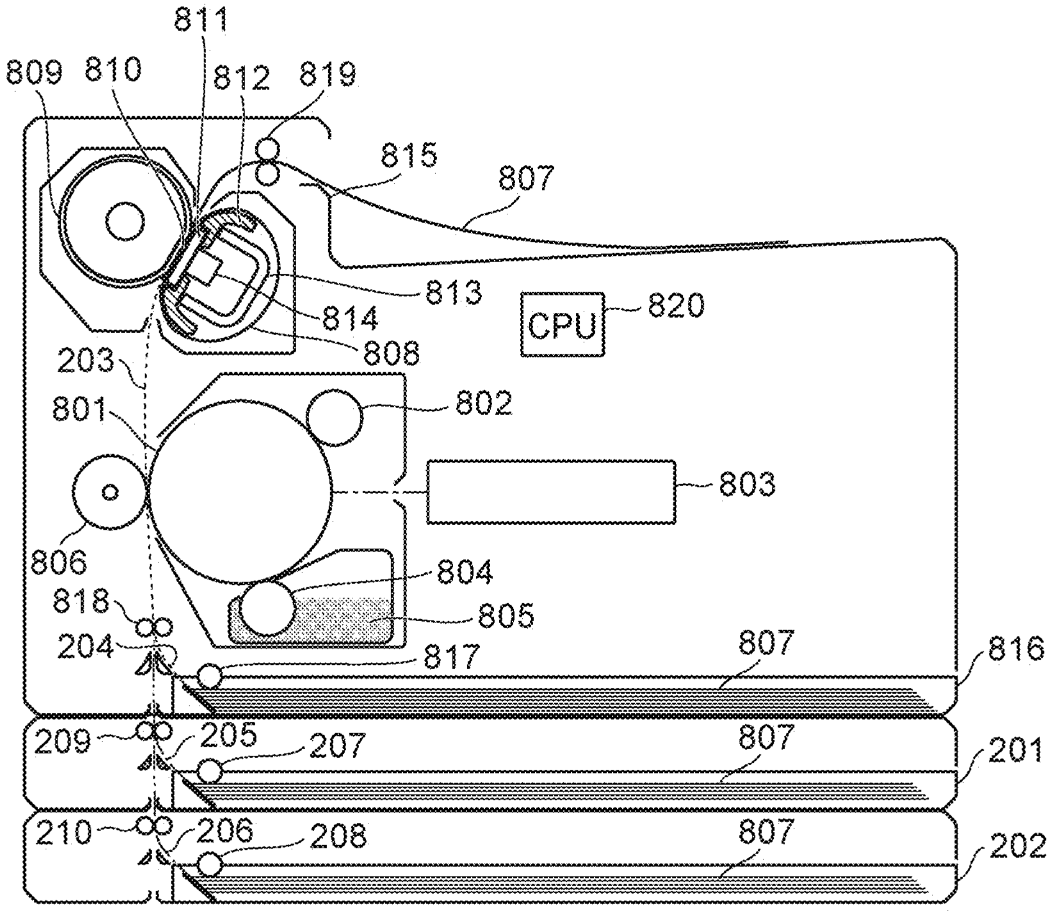
FIG. 2 is a schematic diagram of an image forming apparatus.

FIG. 2 is a schematic diagram illustrating an electrophotographic laser beam printer as an example of an image forming apparatus. A photosensitive drum 801 is an image carrier including a photosensitive layer formed on a surface thereof. The surface layer of the photosensitive drum 801 is charged by a charging roller 802, and then is irradiated with laser light emitted from a laser scanner 803 so that an electrostatic latent image is formed thereon. A developing roller 804 supplies toner 805 to the photosensitive drum 801 to form a toner image. A transfer roller 806 is an example of a transfer unit that supplies a transfer charge to a paper sheet (recording material) 807. The photosensitive drum 801 and the transfer roller 806 form a transfer nip portion in which the toner image is transferred to the paper sheet 807. A fixing film 808 is a tubular rotating body having a longitudinal direction extending in the depth direction in FIG. 2. A pressing roller 809 is a rotating body that is pressed against the fixing film 808 to form a fixing nip 810.

A fixing heater 811 is disposed in a space inside the fixing film 808. The fixing heater 811 includes, for example, a ceramic base material, a heat generating layer, and a protective layer. A stay 812 and a reinforcing member 813 that serve as holding members for holding the fixing heater 811 are disposed inside the fixing film 808. A thermistor 814 is a temperature detector for detecting the temperature of the fixing heater 811.

The fixing device fixes the toner image to the paper sheet 807 by heating the toner image with the fixing heater 811. The fixing heater 811 is connected in series to an overheating prevention element, composed of a temperature fuse (not illustrated), and an electric-power-supply drive unit. The paper sheet 807 is transported from the fixing nip 811 and output to the outside of the image forming apparatus through a paper output port 815. A first sheet feeding unit 816 is provided in the main body of the image forming apparatus as a sheet feeding unit for feeding paper sheets 807. A sheet feeding roller 817 feeds the paper sheets 807 from a sheet feeding position. The paper sheets 807 fed by the sheet feeding roller 817 are transported along a transport path 203 by transport rollers 818 and 819.

Figure 9:
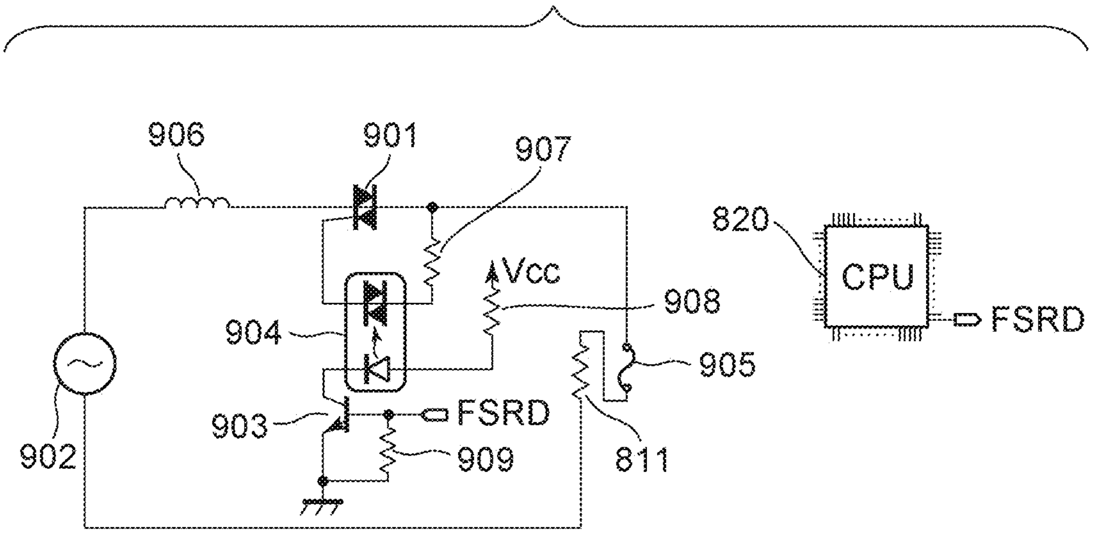
FIG. 9 is a schematic diagram of a circuit for supplying electricity to the fixing heater.

FIG. 9 is a schematic diagram illustrating the electrical connection in a circuit for supplying electric power to the fixing heater 811. A central processing unit (CPU) 820, which is a control unit of the image forming apparatus and may include one or more processors, circuitry, or combinations thereof, controls the electricity supplied to the fixing heater 811 from a commercial power supply 902 through a triac 901. When the image forming apparatus starts a print operation, the temperature control of the fixing heater 811 is started. The CPU 820 controls the output of a fuser drive (FSRD) signal based on the detection result obtained by the thermistor 814. To increase the temperature of the fixing heater 811, the CPU 820 sets the output of the FSRD signal to H to set the transistor 903 to an ON state. A current flows through the transistor 903, so that a photo-triac coupler 904 is driven and supplies a gate current to the triac 901. As a result, the triac 901 changes to a conducting state, and a current is supplied to the fixing heater 811 through an overheating prevention element 905. A coil 906 reduces electrical noise generated when the triac 901 changes to the conducting state. Resistances 907 and 908 limit the current. The FPOT of the image forming apparatus (time for the image forming apparatus to discharge the first paper sheet after staring a print operation) is defined as 7 seconds when, for example, the paper sheet is A4-sized (297 mm long) and has a basis weight of 80 $g/m^2$ (grams/meter$^2$). Assume that the transport speed of the paper sheet 807 is 150 mm/s (millimeters/second), that the width of the fixing nip 810 is 10 mm, and that the distance from the fixing nip 810 to the paper output port 815 is 50 mm. In this case, a pre-fixation heating period $t_1$ from when the print operation is started to when the paper sheet 807 reaches the fixing nip 810 is expressed as $t_1$=FPOT−(297+10+50)/transport speed, and is about 4.62 seconds.

Assume that the image forming apparatus is installed in an environment with an ambient temperature of 15 degrees and that the fixing heater 811 needs to be heated to, for example, 200° C. in the pre-fixation heating period $t_1$ to appropriately fix the toner image to the paper sheet 807. In this case, the fixing device may use, for example, about 3080 J (joules) of energy. When the commercial power supply 902 supplies electricity at a power supply voltage of, for example, 100 Vac (alternating current voltage) and a duty of 100% in the period $t_1$, the appropriate resistance value of the fixing heater 811 is about 15Ω (ohms). The control cycle of the CPU 820 that controls the triac 901 is, for example, 4 half-waves with respect to the frequency of the commercial power supply 902. The minimum unit of electricity supplied to the fixing heater 811 is 1.8° in terms of the phase angle of the commercial power supply 902, and the power supply voltage of the commercial power supply 902 is 100 Vac.

Figure 8:
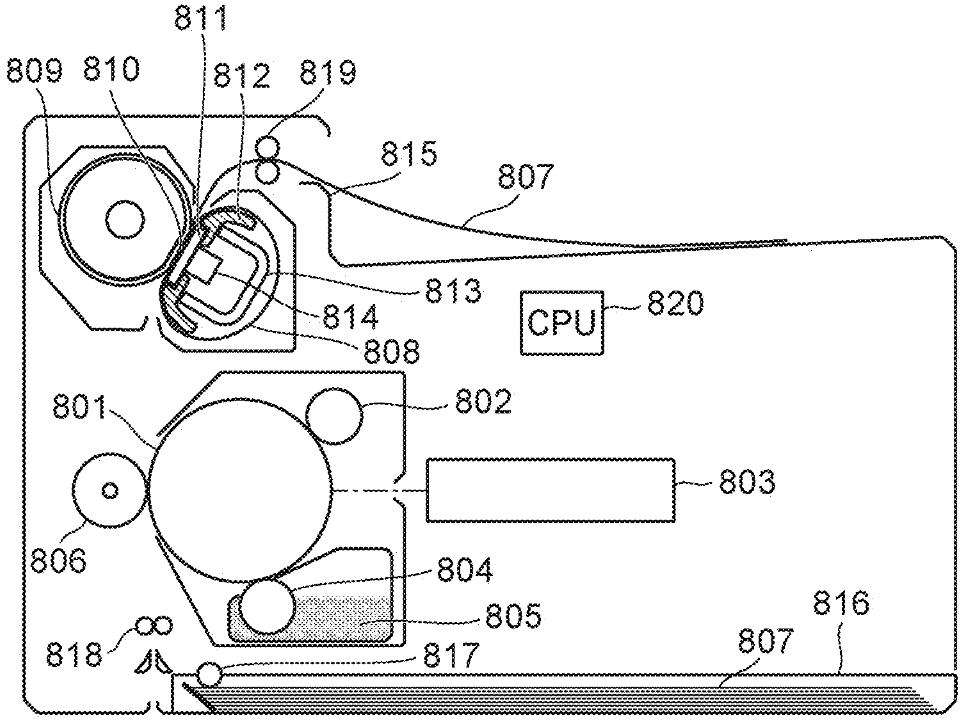
FIG. 8 is a schematic diagram of an image forming apparatus including one sheet feeding unit.

The image forming apparatus may be configured to allow commercially available, external optional sheet-feeding devices to be attached to the main body thereof so that a larger amount of paper sheets or different types of paper sheets can be stored in sheet feeding units. FIG. 8 is a schematic diagram illustrating an image forming apparatus including only one sheet feeding unit. FIG. 2 is a schematic diagram of an image forming apparatus including plural sheet feeding units provided by connecting external optional sheet-feeding devices.

When a paper sheet stored in an external optional sheet-feeding device is used, the transport time to transport the paper sheet from a transport start position to the fixing nip portion is longer than when the paper sheet is fed from the sheet feeding unit in the main body. The image forming apparatus of the present embodiment includes three sheet feeding units that store the paper sheets 807 and feed the paper sheets 807 stored therein. The first is the first sheet feeding unit 816 included in the image forming apparatus as standard equipment. The second is a second sheet feeding unit 201 connected to the bottom of the first sheet feeding unit 816 as an external optional sheet-feeding device. The third is a third sheet feeding unit 202 connected to the bottom of the second sheet feeding unit 201 as another external optional sheet-feeding device. The transport path 203 shown by the dotted line is a common transport path between each sheet feeding unit and the fixing nip 810. Individual transport paths from the sheet feeding units to the transport roller 818 include a path 204 shown by the dashed line, a path 205 shown by the one-dot dashed line, and a path 206 shown by the two-dot dashed line. Sheet feeding rollers 207 and 208 are elements configured to feed the paper sheets 807 from the respective sheet feeding positions.

Assume that the FPOT of the image forming apparatus is 7 seconds when the ambient temperature of the installation environment is 15° C. or higher, when a paper sheet 807 is fed from the first sheet feeding unit 816, and when, for example, the paper sheet 807 is A4-sized (297 mm long) and has a basis weight of 80 g/m$^2$. The transport speed of the paper sheet 807 is 150 mm/s, the width of the fixing nip 810 is 10 mm, and the distance from the fixing nip 810 to the paper output port 815 is 50 mm. The fixing heater 811 needs to be heated to, for example, 200° C. in the pre-fixation heating period $t_1$ to appropriately fix the unfixed image to the paper sheet 807 in the environment with an ambient temperature of 15 degrees. The pre-fixation heating period $t_1$ from when the print operation is started to when the paper sheet 807 reaches the fixing nip 810 is 4.62 seconds, and the image heating-and-fixing device may use, for example, about 3080 J of energy. Accordingly, the resistance value of the fixing heater 811 is set to 15Ω (ohms).

FIG. 3 is a table showing the transport distance from each sheet feeding unit to the fixing nip 810. As illustrated in FIG. 3, the transport distance by which each paper sheet is transported from each sheet feeding unit to the fixing nip 810 differs depending on the sheet feeding position of each sheet feeding unit. More specifically, the transport distance from the sheet feeding position of the paper sheets 807 stored in the third sheet feeding unit 202 to the fixing nip 810 is longer than the transport distance from the sheet feeding position of the paper sheets 807 stored in the second sheet feeding unit 201 to the fixing nip 810. The transport distance from the sheet feeding position of the paper sheets 807 stored in the second sheet feeding unit 201 to the fixing nip 810 is longer than the transport distance from the sheet feeding position of the paper sheets 807 stored in the first sheet feeding unit 816 to the fixing nip 810.

When a paper sheet fed from the first sheet feeding unit 816 is subjected to the fixing process, the period $t_1$ in which the fixing device is heated before the fixing process cannot be reduced because the activation of the laser scanner 803 and the formation of the toner image are also performed. As a result, the pre-fixation heating period differs depending on the above-described transport speed and the difference in the transport distance from each sheet feeding unit to the fixing nip 810, as illustrated in FIG. 3.

FIG. 4 is a table showing the relationship between the pre-fixation heating period $t_x$ for each sheet feeding unit and the maximum energization duty of the triac 901 to supply the above-described 3080 J of energy to the fixing heater 811 in each pre-fixation heating period $t_x$. As the transport distance to the fixing nip 810 increases, the pre-fixation heating period $t_x$ increases, and therefore the maximum energization duty for the fixing heater 811 decreases.

Figure 1:
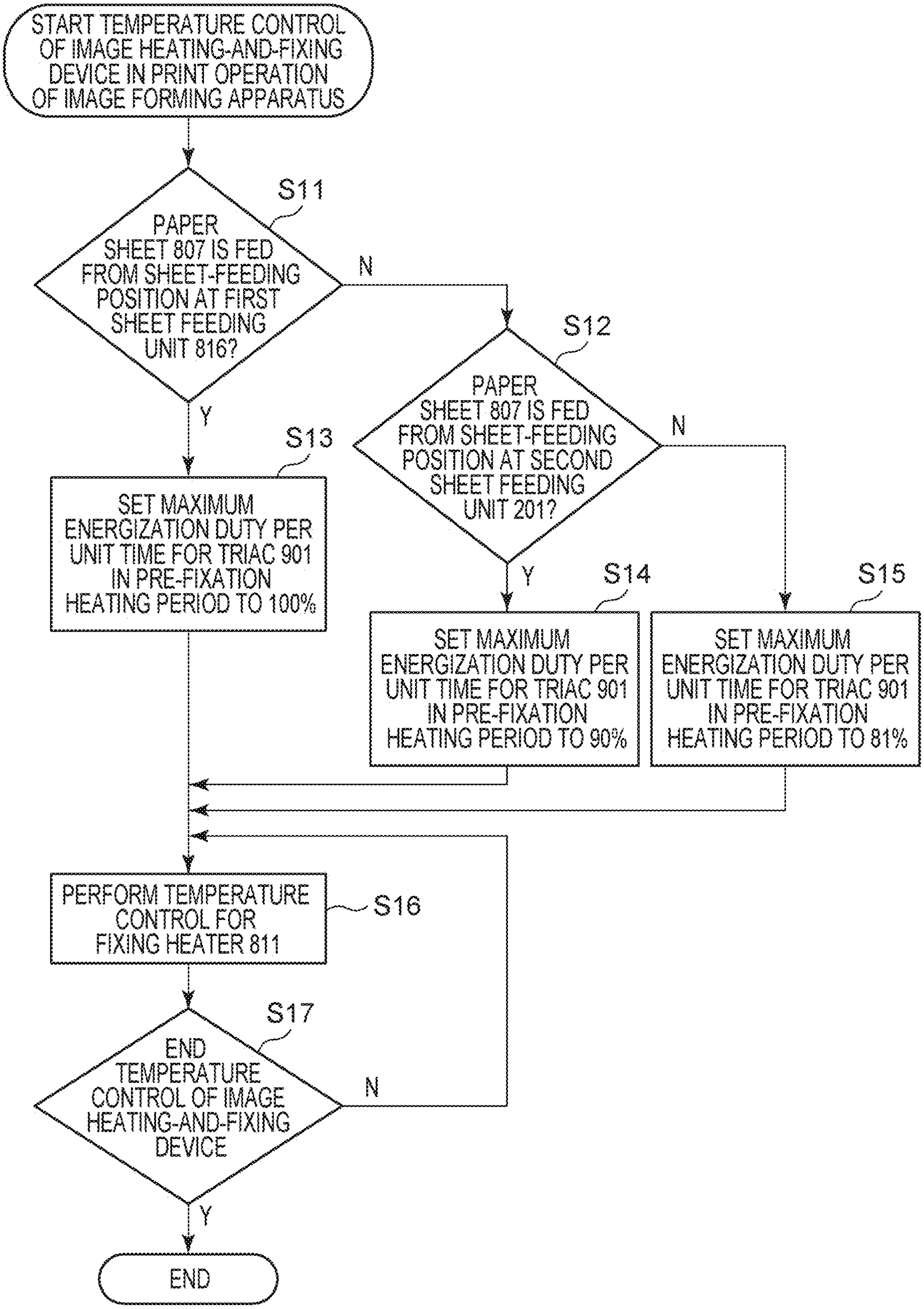
FIG. 1 is a flowchart for setting the maximum energization duty per unit time.

FIG. 1 is a flowchart for setting the maximum energization duty per unit time. Each step of the flowchart of FIG. 1 is executed by the CPU 820. The CPU 820 executes each step of the flowchart of FIG. 1 by executing a program read from a read only memory (ROM) (not illustrated) and deployed in a random-access memory (RAM) (not illustrated).

When the image forming apparatus starts the print operation, in S11 and S12, the CPU 820 determines which of the first sheet feeding unit 816, the second sheet feeding unit 201, and the third sheet feeding unit 202 is the sheet feeding unit from which the paper sheet 807 is fed. The sheet feeding unit to be used is selected based on information such as the size or the basis weight of the paper sheet to be used. Based on the result of the determination in S11 and S12, the CPU 820 sets the maximum energization duty per unit time for the triac 901 in the pre-fixation heating period in S13 to S15. More specifically, when the sheet feeding unit is the first sheet feeding unit 816, the maximum energization duty is set to 100%. When the sheet feeding unit is the second sheet feeding unit 201, the maximum energization duty is set to 90%. When the sheet feeding unit is the third sheet feeding unit 202, the maximum energization duty is set to 81%. After the maximum energization duty is set in S13 to S15, the CPU 820 starts the temperature control of the fixing heater 811 in S16. Thus, limitation to the maximum energization duty per unit time, applied only in the pre-fixation heating period, is set. When the print operation is completed, the temperature control of the fixing heater 811 is ended in S17.

Figure 5:
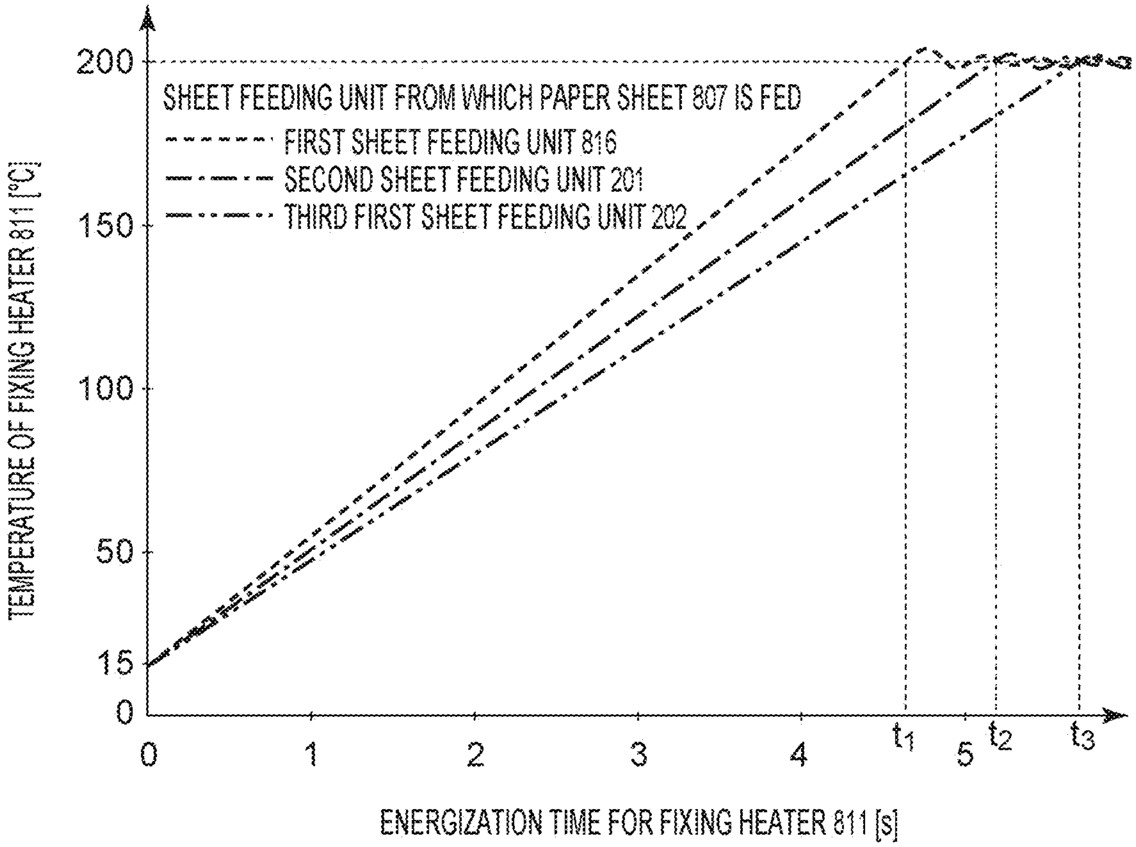
FIG. 5 is a graph showing the temperature variation of a fixing heater in a pre-fixation heating period.

FIG. 5 is a graph showing the temperature variation of the fixing heater 811 in the pre-fixation heating period when the above-described control is performed. As illustrated in FIG. 5, the temperature increases in a different manner for each sheet feeding unit. As the transport distance of the paper sheet 807 from the sheet feeding unit to the fixing nip 810 increases, the temperature increases more slowly. For example, when the paper sheet 807 is fed from the first sheet feeding unit 816 in the print operation, the target temperature 200° C. is reached after the pre-fixation heating period $t_1$ of 4.62 seconds. In contrast, when the paper sheet 807 is fed from the third sheet feeding unit 202 in the print operation, the target temperature 200° C. is reached after a pre-fixation heating period $t_3$ of 5.69 seconds. If the print operation is performed on the paper sheet 807 fed from the third sheet feeding unit 202 without using the control illustrated in FIG. 1, the image heating-and-fixing device may use a temperature-maintaining period in the waiting period ($t_3$-$t_1$) from when the target temperature for the fixing heater 811 is reached to when the paper sheet 807 reaches the fixing nip 810. This temperature-maintaining period can be eliminated.

In the first embodiment, the maximum electric power supplied to the fixing heater 811 per unit time is controlled differently depending on the sheet feeding position from which the paper sheet is fed. According to this control, the maximum energization duty for the fixing heater 811 in the pre-fixation heating period is changed depending on the sheet feeding position from which the paper sheet 807 is fed. As a result, the temperature of the fixing heater 811 can be increased to the target temperature by the time the paper sheet 807 reaches the fixing nip 810, and unnecessary electric power consumption can be suppressed.

In the first embodiment, phase control is performed in which the minimum unit of electricity supplied to the fixing heater 811 is based on the phase angle of the commercial power supply 902. However, similar control can also be performed by wave number control in which the minimum control unit is a half-wave of the commercial power supply 902. For example, assuming that 15 half-waves of the commercial power supply 902 is the electricity control cycle, the maximum number of half-waves for supplying electricity in each electricity control cycle is set to 15 half-waves when the sheet feeding unit is the first sheet feeding unit 816, 14 half-waves when the sheet feeding unit is the second sheet feeding unit 201, and 13 half-waves when the sheet feeding unit is the third sheet feeding unit 202. As a result, the temperature of the fixing heater 811 can be increased to the target temperature by the time the paper sheet 807 reaches the fixing nip 810, and unnecessary electric power consumption can be suppressed.

In the first embodiment, the maximum energization duty in the pre-fixation heating period is set before electricity is supplied to the fixing heater 811. However, a similar effect can also be obtained when the maximum energization duty is set not before electricity is supplied but after the electricity control for the fixing heater 811 is started.

In the first embodiment, the sheet feeding position is selected from the three sheet feeding positions, that is, the first sheet feeding unit 816, the second sheet feeding unit 201, and the third sheet feeding unit 202. However, the sheet feeding position is not limited to this as long as plural sheet feeding units are provided.

In the first embodiment, the maximum energization duty is set for when the initial temperature of the fixing heater 811 is 15° C. However, the maximum energization duty may be corrected as appropriate in accordance with the difference between the initial temperature of the fixing heater 811 at the start of the print operation and the target temperature.

Second Embodiment

In the first embodiment, the maximum energization duty for the fixing heater 811 in the pre-fixation heating period is set based only on the sheet feeding position from which the paper sheet 807 is fed. The effective value of the commercial power supply voltage supplied to the image forming apparatus differs depending on the country in which the image forming apparatus is sold. Therefore, the optimum electric power to be supplied to the image heating-and-fixing device can be set by optimizing the resistance value of the fixing heater 811 based on the FPOT in accordance with the country in which the image forming apparatus is sold.

However, since the individual optimization leads to an increase in the product cost, the specifications of the fixing heater 811 may be standardized in countries with similar effective values of commercial power supply voltages. For example, products sold in Japan, in which the effective value of the commercial power supply voltage is 100 V, and products sold in North America, in which the effective value of the commercial power supply voltage is 115 V, may include the fixing heaters 811 of the same specifications. In this case, the resistance value of each fixing heater 811 is set to satisfy the FPOT for the lower one of the effective values of the commercial power supply voltages, that is, 100 V. As in the first embodiment, the resistance value is set to 15Ω. When the effective value of the commercial power supply voltage is 100 V, the peak electric power consumable by the fixing heater 811 is about 667 W. In contrast, when the effective value of the commercial power supply voltage is 115 V, the peak electric power consumable by fixing heater 811 is about 882 W, allowing the fixing heater 811 to reach the target temperature in a shorter time.

Figure 7:
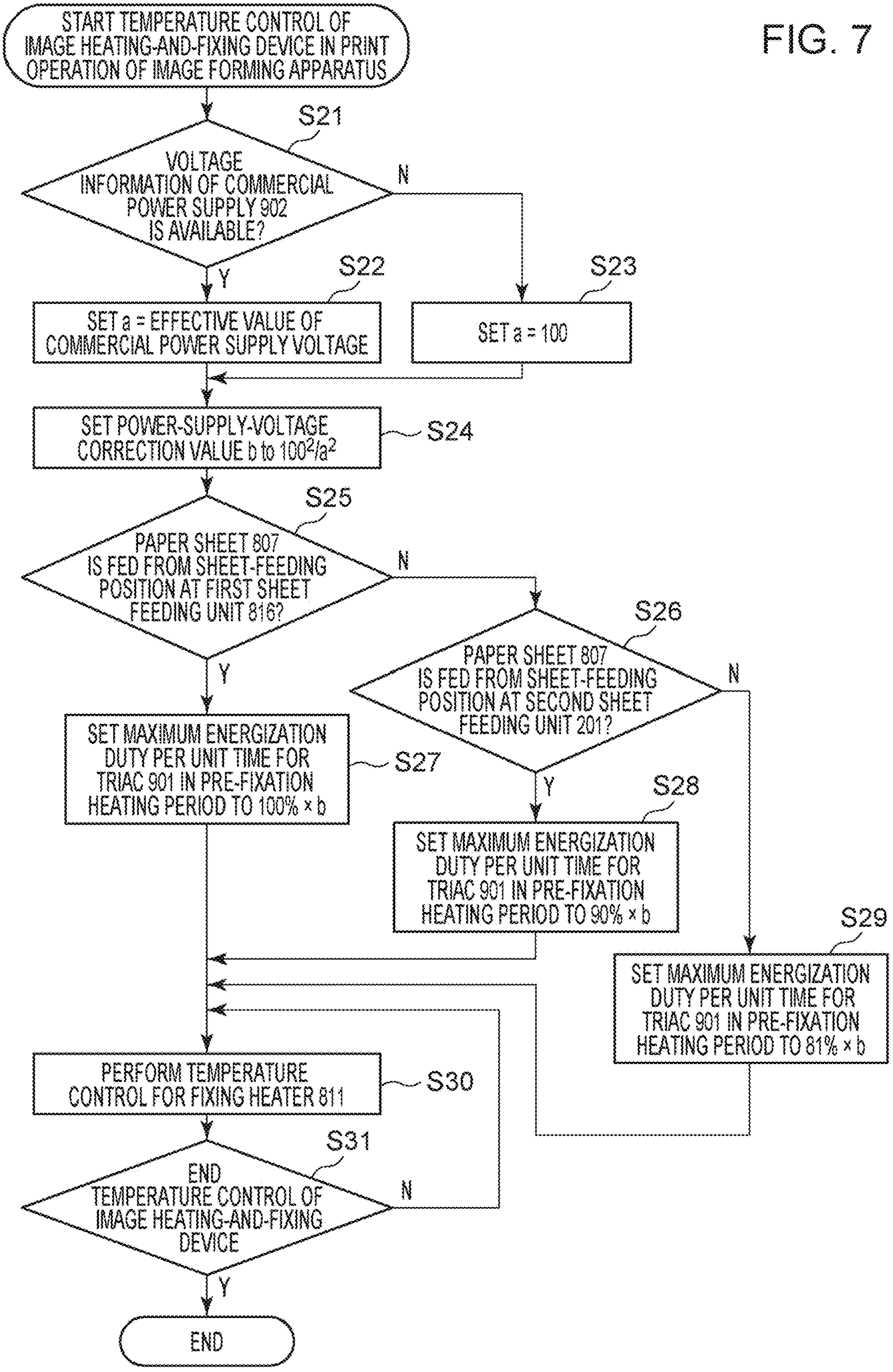
FIG. 7 is a flowchart for setting the maximum energization duty per unit time according to the second embodiment.

FIG. 6 is a table showing the maximum energization duty used per unit time to supply 3080 J of energy when the effective value of the voltage of the commercial power supply 902 is 100 Vac and 115 Vac. It is clear from the table that when the commercial power supply voltage is taken into consideration, the maximum energization duty per unit time is selected from a greater number of values than in the first embodiment. FIG. 7 is a flowchart for setting the maximum duty used in the pre-fixation heating period in accordance with the voltage of the commercial power supply 902. Each step of the flowchart of FIG. 7 is executed by the CPU 820. The CPU 820 executes each step of the flowchart of FIG. 7 by executing a program read from a ROM (not illustrated) and deployed in a RAM (not illustrated).

The information of the effective value of the voltage in the county to which the image forming apparatus is shipped may be stored in the CPU 820 as the voltage information of the commercial power supply 902 when the image forming apparatus is shipped from the production factory. Alternatively, the image forming apparatus may include a power supply voltage detector for the commercial power supply 902.

Alternatively, a user may set the voltage information through a user interface provided in the image forming apparatus. When the image forming apparatus starts the print operation, the CPU 820 checks the effective value of the voltage of the commercial power supply 902 in S21. In S22 or S23, the CPU 820 sets the voltage information of the commercial power supply 902 as a. Then, in S24, the CPU 820 calculates $100^2/a^2$ based on the alternating current voltage of 100 Vac as a power-supply-voltage correction value b. Subsequently, in S25 and S26, the CPU 820 determines which of the first sheet feeding unit 816, the second sheet feeding unit 201, and the third sheet feeding unit 202 is the sheet feeding unit from which the paper sheet 807 is fed. Based on the result of the determination, the CPU 820 sets the maximum energization duty per unit time for the triac 901 in the pre-fixation heating period in S27 to S29. More specifically, when the sheet feeding unit is the first sheet feeding unit 816, 100%×power-supply-voltage correction value b is set. When the sheet feeding unit is the second sheet feeding unit 201, 90%×power-supply-voltage correction value b is set. When the sheet feeding unit is the third sheet feeding unit 202, 81%×power-supply-voltage correction value b is set. After the maximum energization duty is set, the CPU 820 starts the temperature control of the fixing heater 811 in S30. Thus, limitation to the maximum energization duty per unit time, applied only in the pre-fixation heating period, is set. When the print operation is completed, the temperature control of the fixing heater 811 is ended in S31.

In the second embodiment, the maximum electric power supplied to the fixing heater 811 per unit time is controlled differently depending on the sheet feeding position from which the paper sheet is fed. In other words, the maximum energization duty for the fixing heater 811 in the pre-fixation heating period is changed depending on the sheet feeding position from which the paper sheet 807 is fed in accordance with the transport of the paper sheet 807 from the sheet feeding unit to the fixing nip 810 and the effective value of the power supply voltage of the commercial power supply 902. As a result, the temperature of the fixing heater 811 can be increased to the target temperature by the time the paper sheet 807 reaches the fixing nip 810, and additional operating conditions can be set to suppress unnecessary electric power consumption.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-102730 filed Jun. 22, 2023, which is hereby incorporated by reference herein in its entirety.

What is claimed is:

1. An image forming apparatus comprising:

a fixing device including a fixing film having a tubular shape, a fixing heater disposed in a space inside the fixing film and configured to generate heat when electricity is supplied from a commercial power supply, and a pressing roller, the fixing film and the pressing roller forming a fixing nip, the fixing device fixing a toner image formed on a paper sheet to the paper sheet by nipping and transporting the paper sheet at the fixing nip;

a control unit configured to control electric power supplied from the commercial power supply to the fixing heater; and a plurality of feeding units configured to feed paper sheets from a sheet feeding position toward the fixing nip, wherein the control unit sets a maximum duty per unit time for supplying electricity to the fixing heater, the maximum duty corresponding to one of the plurality feeding units that is used, and wherein the control unit sets the maximum duty per unit time based on a sheet transport distance from each feeding unit to the fixing nip.

2. The image forming apparatus according to claim 1, wherein the control unit changes the maximum duty for a period in which the fixing heater is heated from when a print operation is started to when a first paper sheet reaches the fixing nip.

3. The image forming apparatus according to claim 1, wherein the control unit controls the electricity supplied to the fixing heater by phase control.

4. The image forming apparatus according to claim 1, wherein the control unit controls the electricity supplied to the fixing heater by wave number control in which an electricity control cycle is a plurality of half-waves of the commercial power supply.

5. The image forming apparatus according to claim 1, further comprising a voltage detector configured to detect voltage information of the commercial power supply, and wherein the control unit changes maximum electric power supplied to the fixing heater per unit time based on one of the plurality of feeding units that is used in the print operation and the voltage information.

6. The image forming apparatus according to claim 1, wherein the plurality of feeding units includes a first feeding unit and a second feeding unit disposed below the first feeding unit, and wherein the sheet transport distance from a feeding position of a paper sheet fed by the second feeding unit to the fixing nip is longer than a sheet transport distance from a feeding position of a paper sheet fed by the first feeding unit to the fixing nip.

7. The image forming apparatus according to claim 1, wherein the fixing film is nipped between the fixing heater and the pressing roller, and the toner image formed on the paper sheet is heated through the fixing film at the fixing nip.

8. The image forming apparatus according to claim 1, further comprising:

a transfer unit configured to transfer a toner image to each of the paper sheets fed from the plurality of feeding units; and a transport unit configured to transport the paper sheets fed from the plurality of feeding units toward the transfer unit and the fixing device.

* * * * *